C. C. Jones,
Well Tube.

No. 101,469.  Patented Apr. 5. 1870.

Witness
Henry C. Houston
Wm Franklin Seavey

Inventor
C. C. Jones
Per Wm H. Clifford Atty

United States Patent Office.

C. C. JONES, OF PORTLAND, MAINE.

Letters Patent No. 101,469, dated April 5, 1870.

IMPROVEMENT IN WELL-POINTS.

The Schedule referred to in these Letters Patent and making part of the same.

*To all whom it may concern:*

Be it known that I, C. C. JONES, of Portland, in the county of Cumberland and State of Maine, have invented a new and useful Improved Well-Point; and I hereby declare the following to be a full, clear, and exact description thereof, which will enable others to make and use my invention, reference being had to the accompanying drawings forming part of this specification, in which—

Figure 1:
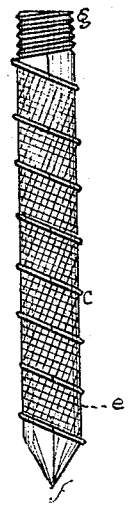
Figure 1 is a side elevation, with the sieve or strainer applied.
Figure 2:
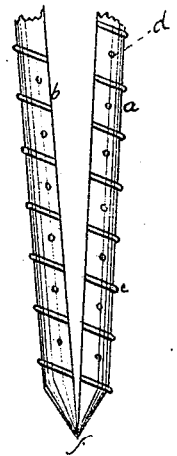
Figure 2 shows the two parts of the point, with the strainer removed.
Figure 3:
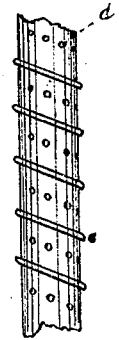
Figure 3 is a portion of the point, showing the spiral projections.

In the well-points now in use, whether they are driven into the ground or whether a hole is bored for their reception, certain practical objections are found to exist against them, and the principal among these is the difficulty of keeping the strainer intact and uninjured, and of repairing the point or the strainer, particularly when the latter is applied inside of the hollow point.

My invention seeks to obviate these objections, and the method in which this is sought to be done can be best comprehended by a description of the device.

My point or lower tube is cast or made in two half-sections, $a$ and $b$, united at their straight edges, so as to form the complete tube.

Around these sections are the spirally-formed projections $c$, which, when the two parts are placed together, form a complete spiral around the tube.

Between the spirals or spirally-running projections are the holes $d$ for the admission of the water from the soil into which the point has penetrated.

Then, around the point and between the spiral projections, is wound the strainer $e$, consisting of a wire netting or open-worked sheet metal.

This netting or sheet is secured at its top and bottom ends by any appropriate fastenings.

Thus, when the point is driven into the ground, the projections of the spiral protect the sieve or strainer from being torn, removed, or in any way injured by contact with the soil or earth it passes through.

A groove may be formed on the tube on the outside thereof, in such a manner as to form the shoulders, and thus serve a useful purpose.

If the strainer is to be applied on the inside, the two halves of the tube, being easily separable, allow of its ready introduction therein, and also of repair of the tube or strainer when required.

This halving of the point is of great convenience and utility.

The projections $c$ may pass around the tube horizontally, if desired, but I consider the spiral form better for convenience of introduction into the soil.

$f$ is the point.

$g$, the screw to unite with the next piece or joint.

What I claim as my invention, and desire to secure by Letters Patent, is—

The well-point, being formed in two half parts, and having the projections, apertures, and strainer as herein described.

C. C. JONES.

Witnesses:
WM. FRANKLIN SEAVEY,
GEO. E. BIRD.